US011134661B2

(12) United States Patent
Chattin et al.

(10) Patent No.: US 11,134,661 B2
(45) Date of Patent: Oct. 5, 2021

(54) SYSTEM FOR FISH TANK CLEANING AND METHOD THEREFOR

(71) Applicant: PetSmart Home Office, Inc., Phoenix, AZ (US)

(72) Inventors: Gary Steven Chattin, Phoenix, AZ (US); Lisa Beilke, Phoenix, AZ (US); Jeffrey Stocker Watson, Phoenix, AZ (US)

(73) Assignee: PetSmart Home Office, Inc., Phoenix, AZ (US)

( * ) Notice: Subject to any disclaimer, the term of this patent is extended or adjusted under 35 U.S.C. 154(b) by 231 days.

(21) Appl. No.: 16/347,339

(22) PCT Filed: Nov. 7, 2017

(86) PCT No.: PCT/US2017/060453
§ 371 (c)(1),
(2) Date: May 3, 2019

(87) PCT Pub. No.: WO2018/085856
PCT Pub. Date: May 11, 2018

(65) Prior Publication Data
US 2019/0281796 A1 Sep. 19, 2019

Related U.S. Application Data

(60) Provisional application No. 62/418,615, filed on Nov. 7, 2016.

(51) Int. Cl.
*A01K 63/04* (2006.01)
(52) U.S. Cl.
CPC .......... *A01K 63/045* (2013.01); *A01K 63/047* (2013.01)

(58) Field of Classification Search
CPC ...... A01K 63/10; A01K 63/045; A01K 61/00; A01K 61/10; A01K 63/003; A01K 63/047; A01K 63/006; A01K 63/04; A01K 63/00
(Continued)

(56) References Cited

U.S. PATENT DOCUMENTS 3,814,254 A * 6/1974 Schatz ................. A01K 63/045
210/167.23
3,892,199 A * 7/1975 Huyler ................. A01K 63/006
119/260
(Continued)

FOREIGN PATENT DOCUMENTS

CN 2088334 11/1991
CN 2746755 12/2005
(Continued)

*Primary Examiner* — Brady W Frazier
*Assistant Examiner* — Zoe Tam Tran
(74) *Attorney, Agent, or Firm* — Duane Morris LLP

(57) ABSTRACT

A fish tank includes a first water chamber for providing living space for fish; a second water chamber in fluid connection with the first water chamber with a grating therebetween. The openings of the grating are sized to keep the first water chamber and the second water chamber fluidly connected but prevent fish or other aquatic animals from entering the second water chamber. In an embodiment, a one-way valve allows water to flow out of the second water chamber and prevents water from flowing back into the first water chamber. A removable syringe with a plunger, a barrel and an orifice is provided such that when the orifice is connected to the one-way valve means and the plunger is pulled out of the barrel, water in the second water chamber flows into the barrel of the removable syringe through the one-way valve means.

8 Claims, 6 Drawing Sheets

(58) Field of Classification Search
USPC .................. 119/245, 248, 251, 259, 264, 269
See application file for complete search history.

(56) References Cited

U.S. PATENT DOCUMENTS

| | | | |
|---|---|---|---|
| 4,098,230 | A | 7/1978 | Jacoson |
| 4,742,798 | A * | 5/1988 | Blackett ................ A01K 61/17 |
| | | | 119/218 |
| 4,988,436 | A | 1/1991 | Cole |
| 5,096,576 | A | 3/1992 | Szabo |
| 5,160,622 | A * | 11/1992 | Gunderson ............... C02F 3/10 |
| | | | 210/617 |
| 5,693,220 | A | 12/1997 | Sceusa |
| 7,537,692 | B1 | 5/2009 | Hadden |
| 7,578,262 | B2 * | 8/2009 | Vaccari ................ A01K 63/045 |
| | | | 119/259 |
| 2011/0162585 | A1 * | 7/2011 | Tominaga ............... C02F 1/325 |
| | | | 119/259 |
| 2015/0000607 | A1 * | 1/2015 | Reid .................... A01K 63/045 |
| | | | 119/248 |
| 2016/0219840 | A1 * | 8/2016 | Yim ...................... A01K 61/80 |
| 2016/0235043 | A1 * | 8/2016 | Sawicki ............... A01K 63/047 |

FOREIGN PATENT DOCUMENTS

| | | |
|---|---|---|
| CN | 201226970 | 4/2009 |
| CN | 201323814 | 10/2009 |
| CN | 201379544 | 1/2010 |
| CN | CN102986583 | 3/2013 |
| CN | CN202979918 | 6/2013 |
| CN | 103609507 | 3/2014 |
| CN | 205567515 | 9/2016 |
| WO | WO2011145821 | 11/2011 |

\* cited by examiner

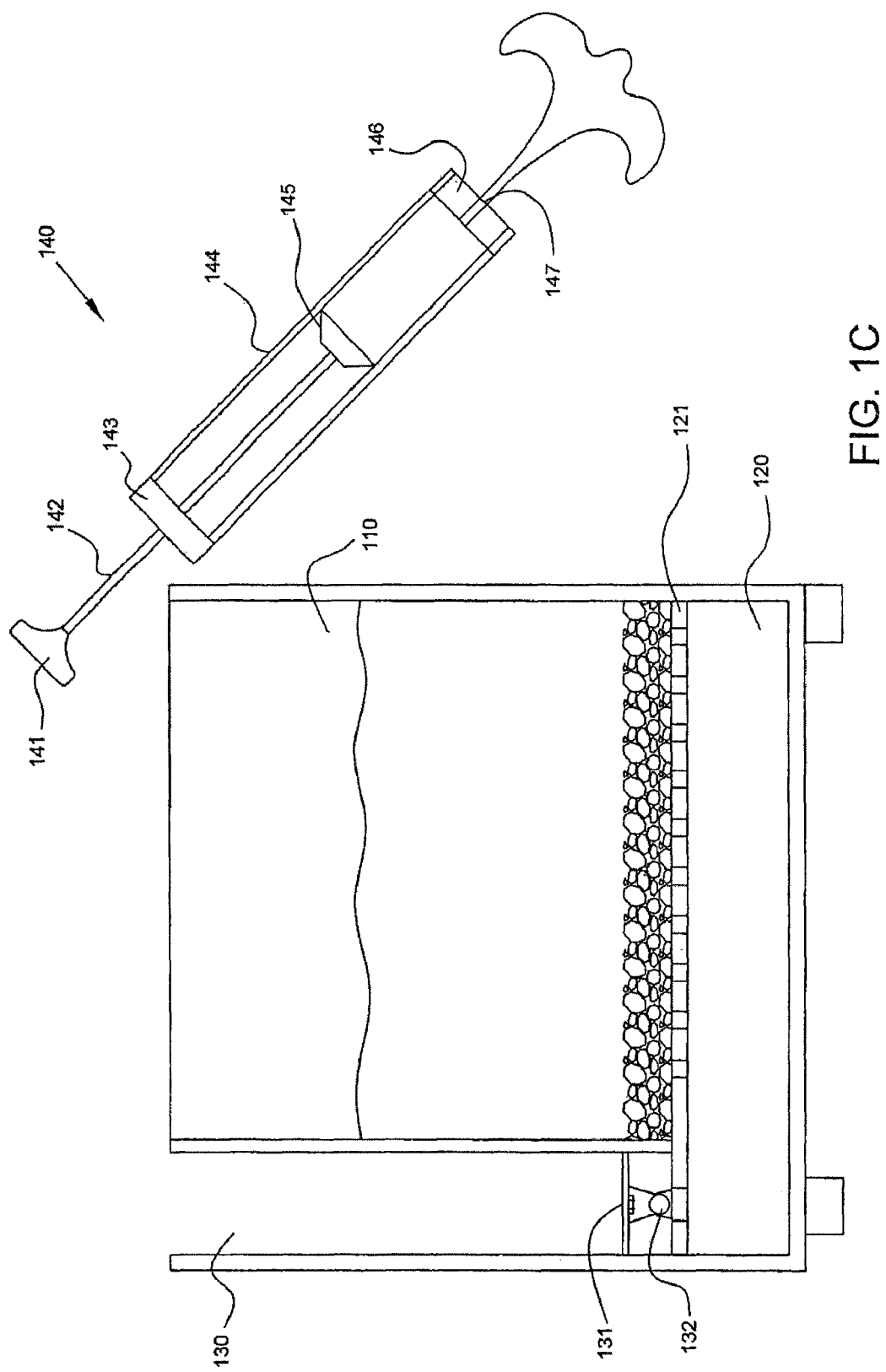

SYSTEM FOR FISH TANK CLEANING AND METHOD THEREFOR

PRIORITY CLAIM

The present application is a U.S. national stage entry under 35 U.S.C. § 371 of International App. No. PCT/US17/60453, filed on Nov. 7, 2017, which claims priority to U.S. Provisional Application No. 62/418,615, filed on Nov. 7, 2016, the entire contents of which are incorporated herein by reference.

BACKGROUND

Fish tanks, or aquariums, are commonly found in home and office settings. A fish tank typically includes a vessel, with at least one transparent side for viewing, where the vessel is filled with water to a particular level to provide a living environment for fish and/or other aquatic creatures. Depending on the species of the fish or other aquatic creatures selected by the owner, the fish tank can be filled with either salt water or fresh water. Some fish tanks are temperature controlled, some fish tanks are equipped with air pumps to maintain an appropriate oxygen level in the fish tanks. Some fish tanks are equipped with additional water pumps and filters to remove undesirable material or ingredients from the water in the tanks. However, for smaller fish tanks it is often desirable to forego the pumps and filters. While this may present an aesthetically-pleasing fish tank for viewing, it does not eliminate the need to clean dirty water and detritus from the tank.

The ecosystem in a natural environment is self-sustainable and capable of maintaining long term stability: debris and waste are recycled and removed so that the water environment is always kept in a livable condition. The ecosystem in a fish tank is not sustainable in the long term on its own; debris and waste have to be artificially removed and clean water needs to be added periodically.

There are fish tanks on the market equipped with electric pumps and other additional electrical accessories for replacing dirty water with clean water. But such fish tanks and accessories are structurally complicated and expensive to maintain.

For a conventional unfiltered fish tank, in order to remove dirty water and detritus, and add clean water, fish and/or other aquatic creatures need to be removed from the fish tank first, then the dirty water and detritus is removed and clean water is added. Fish and/or other aquatic creatures may then be placed back into the fish tank. The process of moving fish out of the fish tank and then back in is very troublesome and time consuming. Additionally, injuries to the fish or aquatic creatures are frequently caused during the process. Thus there is a need for fish tanks which do not require the removal of fish and/or other aquatic creatures during the process of removing dirty water and detritus and adding clean water. Furthermore, there is a need for a relatively inexpensive fish tank with a relatively simple system which is capable of removing dirty water and detritus without removing the fish and/or other aquatic animals from the tank. Such fish tanks need to be easy to maintain, easy to operate and easy to clean.

BRIEF DESCRIPTION OF THE DRAWINGS

FIG. 1C is a schematic illustration of the operation of the fish tank of FIG. 1A, in accordance with some embodiments.

DETAILED DESCRIPTION

Figure 1A:
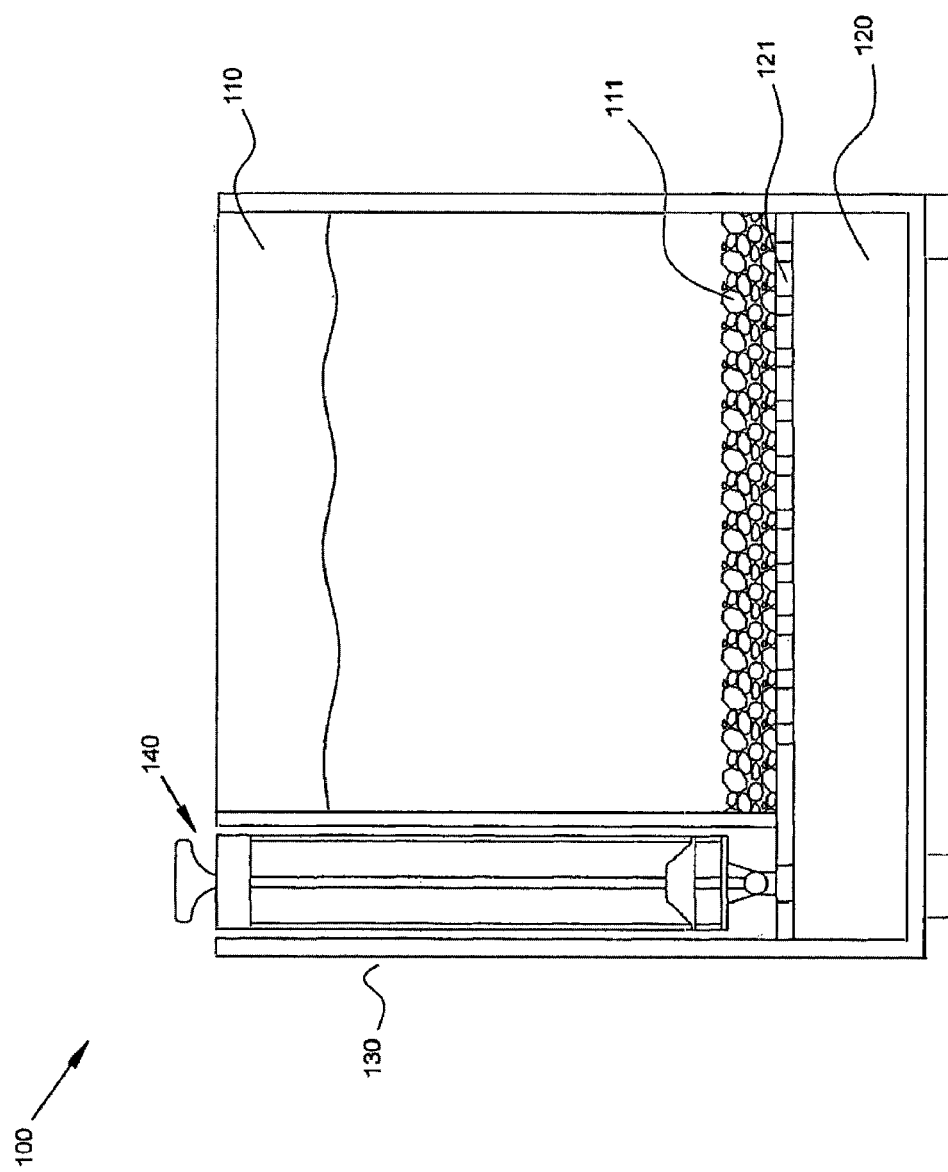
FIG. 1A is a schematic illustration of a fish tank with an integrated cleaning system, in accordance with some embodiments.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIGS. 1A-1D are side views of the a fish tank with an integrated vacuum cleaning system during different stages of operation. According to some embodiments, the fish tank 100 includes a first water chamber 110 for providing a living space for fish, and/or other aquatic creatures, a second water chamber 120 below the first water chamber 110. According to some embodiments, the first water chamber 110 and the second water chamber 120 are separated so that fish, and/or other water creatures cannot enter the second water chamber 120 from the first water chamber 110. According to some embodiments, the first water chamber 110 and the second water chamber 120 are in fluid connection with each other. According to some embodiments, the structure 121 separating the first water chamber 110 and the second water chamber 120 has a plurality of openings to allow water to flow between the first water chamber 110 and the second water chamber 120. The openings on the structure 121 also allow debris and waste in the first water chamber 110 to pass through and, with the help of gravity, accumulate in the second water chamber 120. According to some embodiments, the plurality of openings on the structure 121 separating the first water chamber 110 and the second water chamber 120 are small enough to prevent fish, and/or other aquatic creatures, in the first water chamber 110 from entering the second water chamber 120. According to some embodiments, gravel 111 or other materials may rest on the bottom of the first water chamber 110. According to some embodiments, debris and/or wastes in the first water chamber 110, where fish, and/or other aquatic creatures live, drop to the bottom of the first water chamber 110, then pass through the structure 121 separating the first water chamber and the second water chamber 120. According to some embodiments, debris and/or wastes accumulate in the second water chamber 120, and the water in the second water chamber 120 is considered dirty water and needs to be replaced. According to some embodiments, the fish tank 100 further includes an integrated cleaning system 140. According to some embodiments, integrated cleaning system 140 is a vacuum drawing system. According to some embodiments, the vacuum drawing system 140 is a syringe-like device with a plunger. According to some embodiments, the fish tank 100 further includes a syringe chamber 130 and a removable syringe 140 with a plunger. The syringe 140 fits into the syringe chamber 130 to collect dirty water and detritus, and when the barrel 144 of the syringe 140 is full of dirty water, the syringe 140 is removed out of the syringe chamber 130 to dispose dirty water and detritus in the barrel 144.

According to some embodiments, the syringe 140 includes a plunger 145 and a barrel 144. The plunger 145 is mechanically connected to a shaft 142 and a handle 141. According to some embodiments, just like a typical syringe structure, the plunger 145 fits inside the barrel 144 well enough to smoothly move forward and backward while separating the fluids (air and liquid) on different sides of the plunger 145. The barrel 144 has a first end 143 which is close to the handle 141, and a second end, or a distal end 146 which has an opening, or orifice, 147.

According to some embodiments, on the bottom of the syringe chamber 130, there is an opening 131 and a corresponding one-way valve 132. According to some embodiments, the one-way valve 132 only allows water to flow from the second water chamber 120 into the syringe chamber 130. According to some embodiments, the syringe 140 fits into the syringe chamber 130. And when the syringe 140 is fitted into the syringe chamber 130, the opening 147 on the distal end 146 of the syringe barrel 144 fits appropriately to the opening 131 and the corresponding one-way valve 132.

FIG. 1A is a schematic illustration of a fish tank with an integrated cleaning system, in accordance with some embodiments. According to some embodiments, when the second water chamber 120 has accumulated enough debris and waste from the first water chamber 110, the second water chamber 120 has become dirty enough to be cleaned. As discussed above, the syringe 140 is fitted into the syringe chamber 130, with the opening 147 appropriately aligned and fitted to the opening 131 and the corresponding one-way valve 132. According to some embodiments, the barrel 144 of the syringe 140 is cylindrical and the corresponding syringe chamber 130 is also cylindrical to fit with the syringe 140.

Figure 1B:
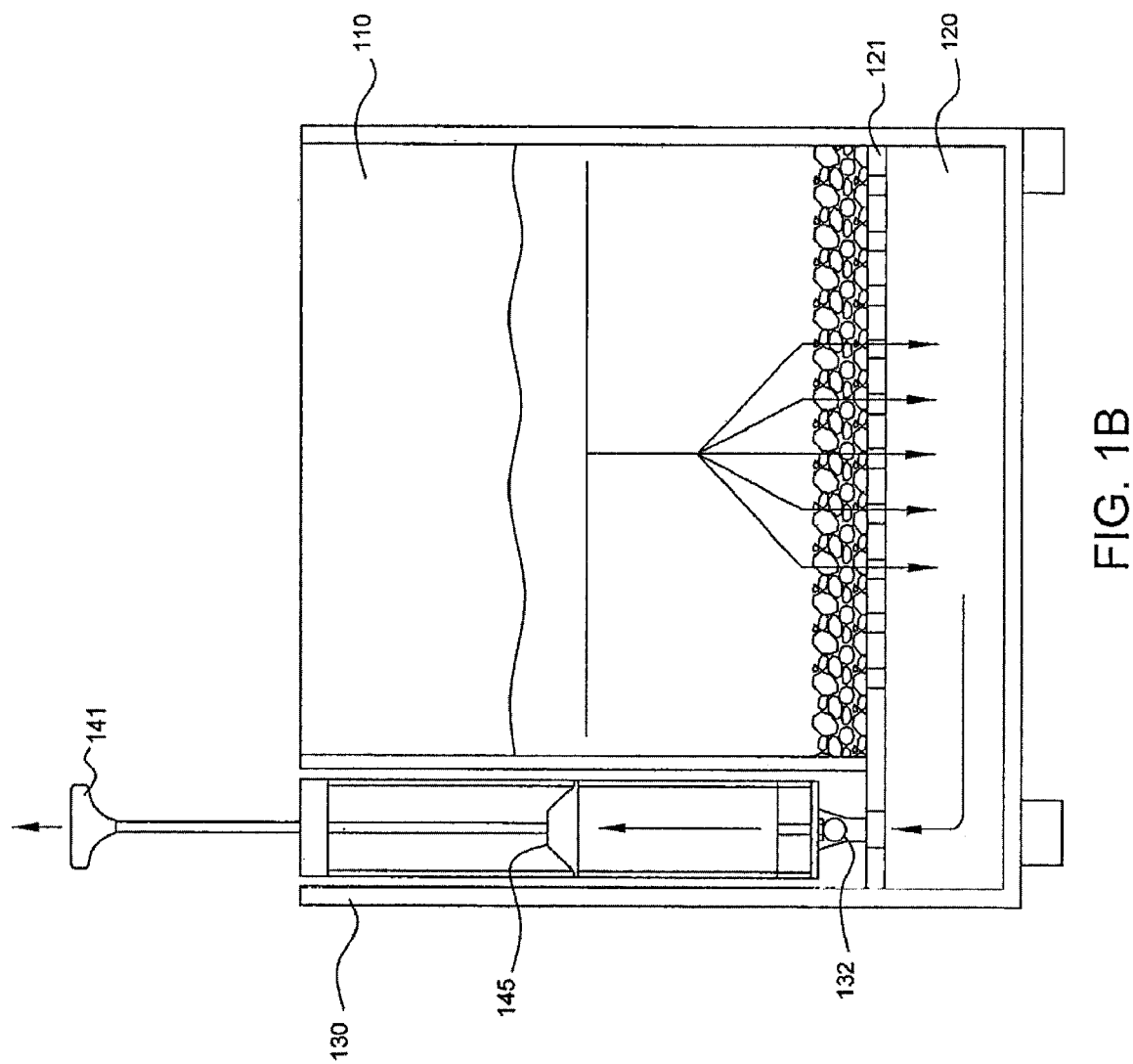
FIG. 1B is a schematic illustration of the operation of the fish tank of FIG. 1A, in accordance with some embodiments.

FIG. 1B is a schematic illustration of the operation of the fish tank with a plunger, in accordance with some embodiments. According to some embodiments, when the syringe 140 is appropriately fitted to position, the handle 141 is pulled up slowly. The air pressure below the plunger 145 inside the barrel 144 decreases, as a result, the normal air pressure in the environment pushes water in the first water chamber 110 through the separation structure 121 into the second water chamber 120, and through the one-way valve 132 and the opening 131 into the syringe chamber 130, and into the barrel 144 through the opening 147. According to some embodiments, the debris and/or waste in the second water chamber 120 are stirred up by the pressure forced flow of water and flushed into the barrel 144. When the barrel 144 has a sufficient amount of, or is full of, dirty water, the pulling of the handle 141 may cease. According to some embodiments, the volume of the barrel 144 is small enough to leave enough water inside the first water chamber 110 when the barrel 144 is full, so that fish and/or other aquatic creatures can still live in the first water chamber 110 without being relocated during the operation of the syringe 140.

FIG. 1C is a schematic illustration of the operation of the fish tank with a plunger, in accordance with some embodiments. According to some embodiments, when the barrel 144 is full of dirty water, the handle 141 is held in position to prevent leakage, the syringe 140 may be removed from the syringe chamber 130. According to some embodiments, the operation of the one-way valve 132 prevents water leakage when the syringe 140 is removed from the syringe chamber 130. The syringe 140 may then be transported to a dirty water disposal location, such as a sink, and the handle 141 is pushed back into the syringe to thereby dispose of the dirty water. The operation may be repeated until a sufficient amount of dirty water has been removed from the fish tank.

Figure 1D:
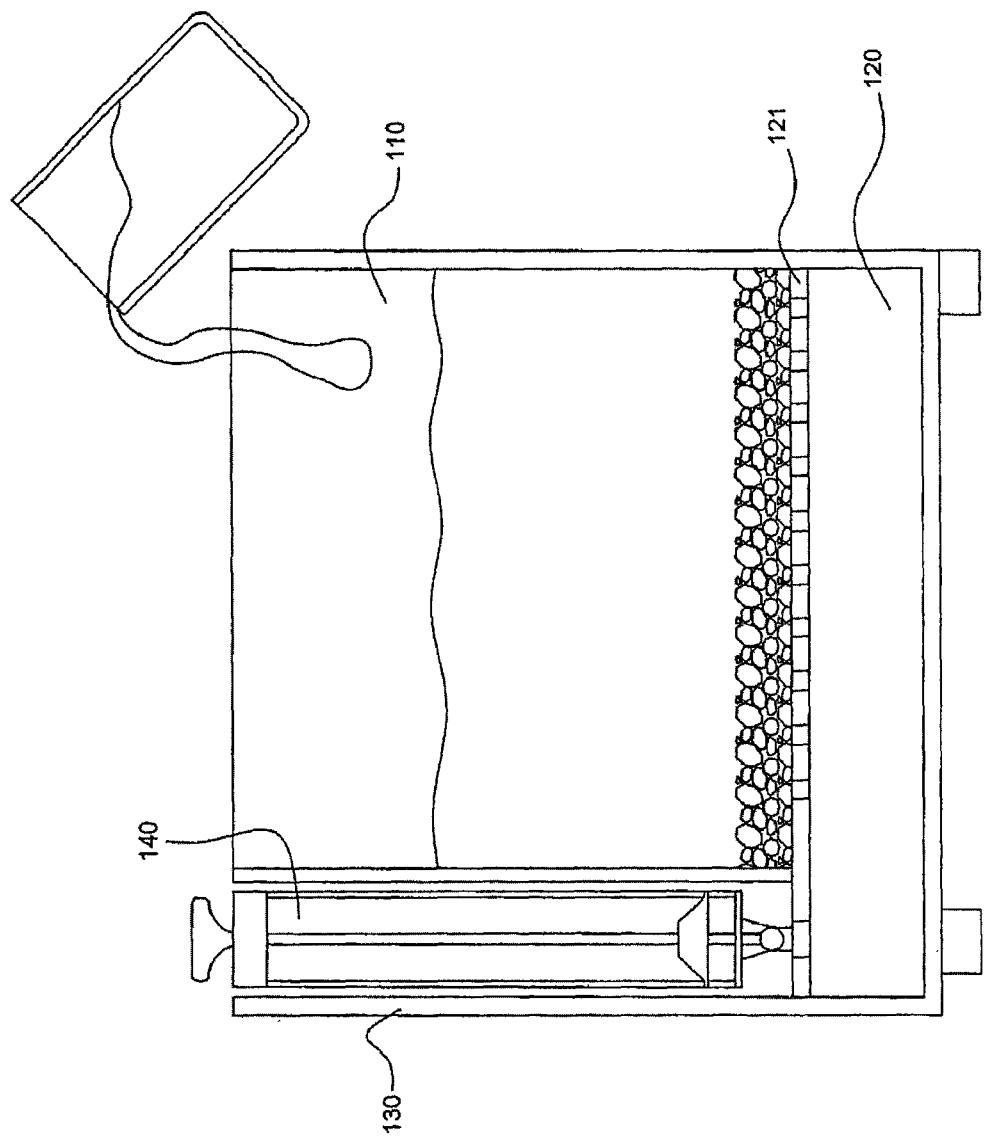
FIG. 1D is a schematic illustration of the operation of the fish tank of FIG. 1A, in accordance with some embodiments.

FIG. 1D is a schematic illustration of the operation of the fish tank with a plunger, in accordance with some embodiments. When enough dirty water has been removed, fresh water may be added into the first water chamber 110. According to some embodiments, the ends 143 and 146 of the barrel 144 can be dissembled and the plunger 145 can be removed from the barrel 144 so that the barrel 144 and the plunger 145 can all be conveniently cleaned.

According to some embodiments, the syringe 140 implements typical syringe structures, and the size of the syringe 140 is designed to fit with the design of the fish tank 100. According to some embodiments, the distal end 146 and the opening 147 of the syringe 140 are specifically designed to match the opening 131 and the one-way valve 132, so that during the process of removing dirty water and detritus from the second water chamber 120, no leakage is caused.

According to some embodiments, there is no separate chamber 130 for hosting the syringe 140, and the syringe 140 is directly attached to the matching opening 131 and the one-way valve 132 to remove dirty water in the second water chamber 120. Although FIGS. 1A-1D illustrate the syringe mounted substantially vertically, in other embodiments the syringe may be mounted substantially horizontally or at some angle in between horizontal and vertical.

According to some embodiments, the opening 131 and corresponding one-way valve 132 are located at other locations on the second water chamber 120 which are convenient for dirty water removal, and which are not in contact with the first water chamber 110. According to some embodiments, the one-way valve 132 implements typical pressure operated one-way valve designs.

Figure 2:
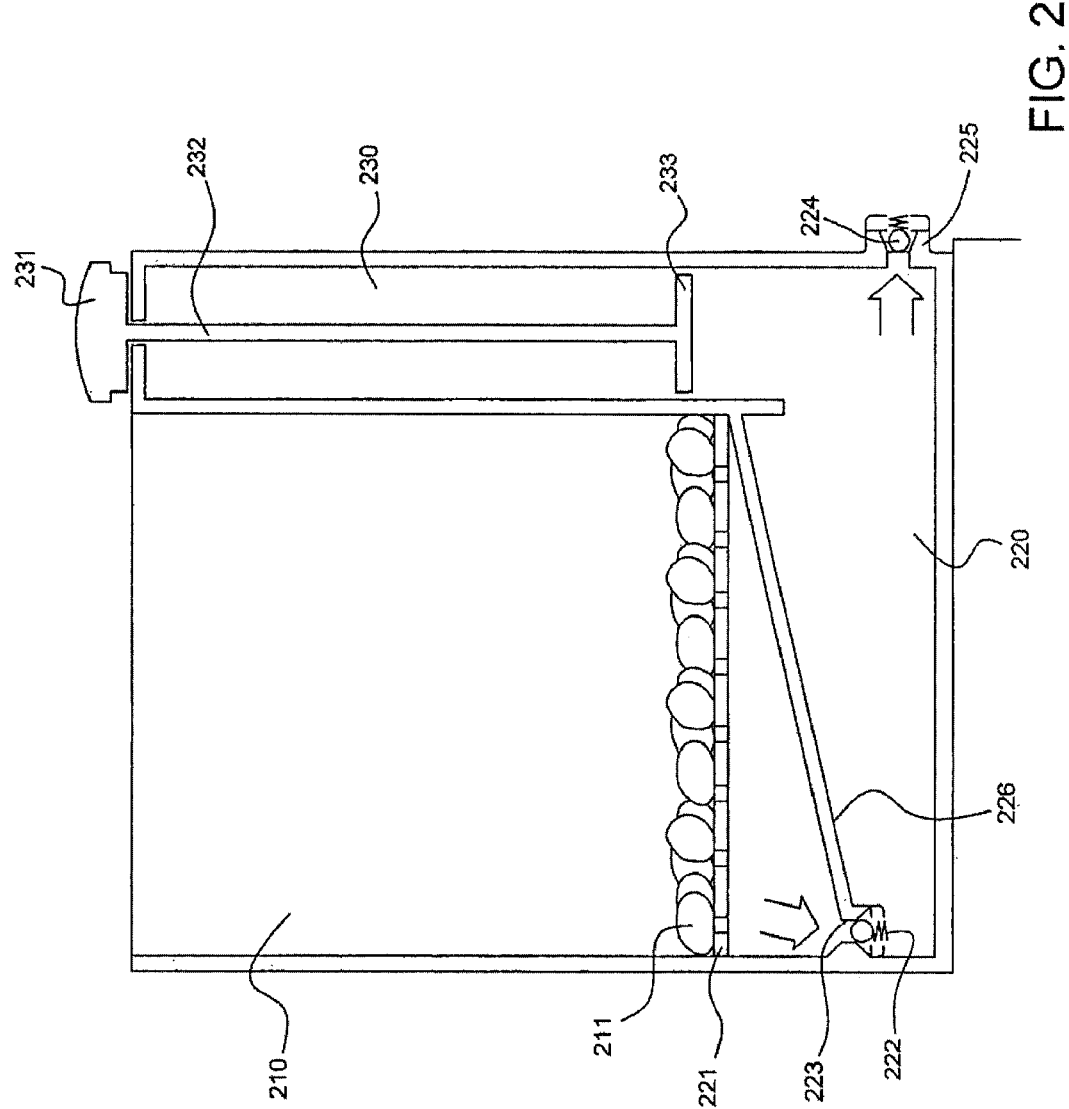
FIG. 2 is a schematic illustration of a variation of a fish tank with an integrated cleaning system, in accordance with some embodiments.

FIG. 2 is a schematic illustration of variation of a fish tank with an integrated cleaning system, in accordance with some embodiments. According to another embodiment, the fish tank includes a first water chamber 210 and a second water chamber 220. The first water chamber 210 is similar to the first water chamber 110 discussed above which provides living space for the fish and/or other aquatic creatures. The first water chamber 210 is separated from the second water chamber 220 with a structure 221 which, similar to the structure 121, has openings to allow fluid connection between the first water chamber 210 and the second water chamber 220 while preventing fish, and/or other aquatic creatures, in the first water chamber 210 from entering the second water chamber 220. Gravel 211 or other similar materials may rest upon the structure 221.

The difference is that, in FIG. 2, the cleaning system is integrated as part of the second water chamber 220 and there is no separate removable cleaning system as discussed in FIG. 1. According to some embodiments, the integrated cleaning system is an integrated plunger. The plunger 233 is mechanically connected to a shaft 232 and a handle 231. The plunger 233 fits into the inside of a third chamber 230. When the plunger 233 is pulled up, part of the third chamber 230 becomes part of the second water chamber. When the plunger 233 is pushed down, the third chamber occupies more space while the second water chamber 220 is decreased. According to some embodiments, a wall 226 with an opening 223 and a one-way valve 222 is implemented to prevent water in the second water chamber 220 from flowing back into the first water chamber 210. According to some embodiments, an opening 224 with another one-way valve 225 is implemented on the wall of the second water chamber 220.

According to some embodiments, when the plunger 233 is pulled up, a negative pressure is created inside the second water chamber 220. As a result, the one-way valve 222 is opened to allow water in the first water chamber 210 to flow into the second water chamber 220. At the same time, the one-way valve 225 is closed by this negative pressure to prevent water from leaking out and maintain the negative pressure. When the plunger 233 is pushed down, a positive pressure is created inside the second water chamber 220, which causes the one-way valve 222 to be closed, preventing water from flowing back into the first water chamber 210. At the same time, the one-way valve 225 is opened by such positive pressure, allowing dirty water and detritus in the second water chamber 220 to flow out of the second water chamber 220.

According to some embodiments, the above pumping process is repeated to move dirty water in the first water chamber 210 into the second water chamber 220, and then move the dirty water in the second water chamber 220 out of the tank. Similar to the discussion in FIGS. 1A-1D, dirty water in the first water chamber 210 containing debris and waste is moved into the second water chamber 220, and then the dirty water in the second water chamber 220 is disposed. No dirty water or detritus is allowed to move back into the first water chamber 210, fresh water can be added into the first water chamber 210 from the top opening of the fish tank. Fish and/or other aquatic creatures can continue to live in the first water chamber 210 during the process. According to some embodiments, the one-way valve 132 implements typical pressure operated one-way valve designs.

Although FIG. 2 illustrates the syringe mounted substantially vertically, in other embodiments the syringe may be mounted substantially horizontally or at some angle in between horizontal and vertical.

Figure 3:
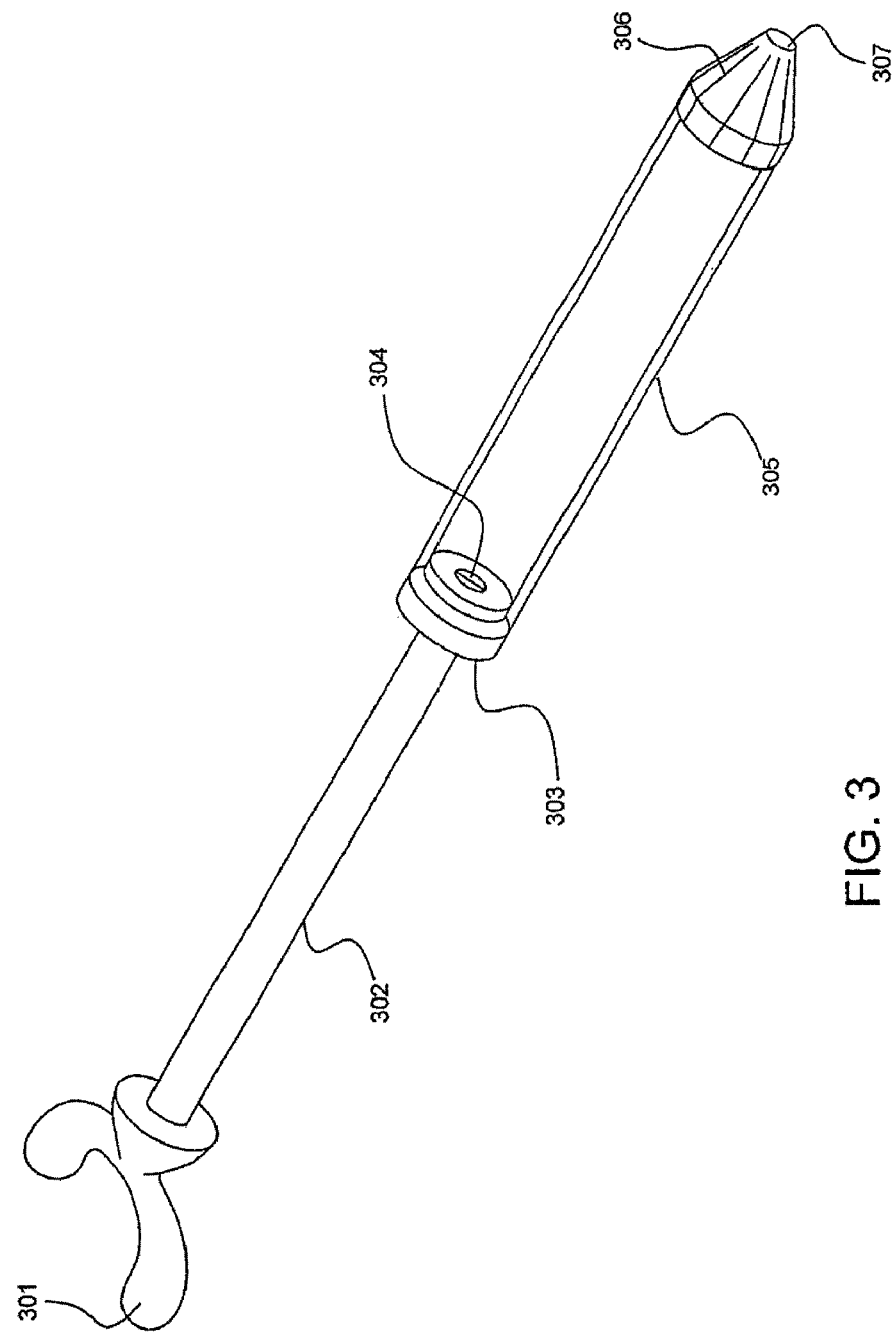
FIG. 3 is a schematic illustration of a plunger which may be used with the integrated cleaning system of the fish tank of FIG. 1A, in accordance with some embodiments.

FIG. 3 is a schematic illustration of a plunger which may be used with the fish tank of FIG. 1A, in accordance with some embodiments. According to some embodiments, a removable syringe 300 include a handle 301, a shaft 302, a plunger 304, a barrel 305 and an orifice 307 at the distal end of the barrel 304. According to some embodiments, the end which is close to the handle includes a sealing member 303 to separate the outer space of the barrel 305 from the inner space of the barrel 305. According to some embodiments, the distal end of the barrel 305 includes a tapered member 306, and the orifice 307 is formed at the tip of the tapered member 306. According to some embodiments, the removable syringe 300 can be implemented in the system discussed in FIGS. 1A-1D.

According to some embodiments, a fish tank is disclosed. The fish tank includes a first water chamber for providing living space for fish; a second water chamber in fluid connection with the first water chamber, wherein the first water chamber and the second water chamber are separated by a grate with openings, wherein the openings keep the first water chamber and the second water chamber fluidly connected, wherein the openings prevent fish from entering the second water chamber; a one-way valve for allowing water flowing out of the second water chamber and preventing water from flowing back into the second water chamber; and a removable syringe with a plunger, a barrel and an orifice, wherein when the orifice is connected to the one-way valve means and when the plunger is pulled in the barrel, water in the second water chamber flows into the barrel of the removable syringe through the one-way valve means, wherein the one-way valve means prevents water in the barrel of the removable syringe from flowing back into the second water chamber. According to some embodiments, the one-way valve is a pressure operated one-way valve.

According to some embodiments, a fish tank is disclosed. The fish tank includes a first water chamber for providing living space for fish; a second water chamber in fluid connection with the first water chamber, the first water chamber and the second water chamber are separated by a grate with openings, the openings keep the first water chamber and the second water chamber fluidly connected, the openings prevent fish from entering the second water chamber; a first one-way valve connecting the first water chamber and the second water chamber, the first one-way valve means allows water to flow out of the first water chamber into the second water chamber, the first one-way valve means prevents water from flowing back into the first water chamber from the second water chamber; a second one-way valve connecting the second water chamber with the exterior air, wherein the second one-way valve means allows water in the second water chamber to flow into the exterior air, the second one-way valve means prevents air from entering the second water chamber; a barrel in fluid connection with the second water chamber; and a plunger fitted inside the barrel, when the plunger is pulled, the first one-way valve means is opened to allow water in the first water chamber to flow into the second water chamber, the second one-way valve means is closed to prevent water from flowing out of the second water chamber; when the plunger is pushed, the first one-way valve means is closed to prevent water in the second water chamber from flowing back into the first water chamber, the second one-way valve means is opened to allow water in the second water chamber to flow into the exterior air.

According to some embodiments, the first one-way valve is a pressure operated one-way valve. According to some embodiments, the second one-way valve is a pressure operated one-way valve. According to some embodiments, the barrel is substantially vertical. According to some embodiments, the barrel is substantially horizontal.

According to some embodiments, a method for removing water from a fish tank is disclosed. The method includes providing a fish tank having a first water chamber having water therein, said first water chamber in fluid communication with a second water chamber via a separator having one or more holes therethrough, wherein said second water chamber has water therein; a device operatively connected to the second water chamber via a one-way valve, wherein said device is capable of drawing a negative pressure; drawing a negative pressure with said device to thereby open the one-way valve and draw water from the second water chamber into the device; and ceasing the drawing of a negative pressure to thereby close the one-way valve. According to some embodiments the device includes a plunger and the step of drawing a negative pressure in the second water chamber is achieved by operating the plunger.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A fish tank, comprising:
   a first water chamber for providing living space for fish;
   a second water chamber in fluid connection with the first water chamber, wherein the first water chamber and the second water chamber are separated by a grate with openings, wherein the openings keep the first water chamber and the second water chamber fluidly connected, wherein the openings prevent fish from entering the second water chamber;
   a one-way valve for allowing water flowing out of the second water chamber and preventing water from flowing back into the second water chamber; and
   a removable syringe is connectable to the one-way valve at a position outside of the first water chamber with a plunger, a barrel and an orifice, wherein when the orifice is connected to the one-way valve and when the plunger is pulled in the barrel, water in the second water chamber flows into the barrel of the removable syringe through the one-way valve means, wherein the one-way valve prevents water in the barrel of the removable syringe from flowing back into the second water chamber.

2. The fish tank of claim 1, wherein the one-way valve is a pressure operated one-way valve.

3. A method for removing water from a fish tank, comprising:
   providing a fish tank having:
      a first water chamber having water therein, said first water chamber in fluid communication with a second water chamber via a separator having one or more holes therethrough, wherein said second water chamber has water therein; and
      a device operatively connected to the second water chamber via a one-way valve at a position outside of the first water chamber, wherein said device is capable of drawing a negative pressure;
   drawing a negative pressure with said device to thereby open the one-way valve and draw water from the second water chamber into the device; and
   ceasing the drawing of a negative pressure to thereby close the one-way valve.

4. The method of claim 3, wherein the device comprises a plunger and the step of drawing a negative pressure in the second water chamber is achieved by operating the plunger.

5. The fish tank of claim 1, wherein the one-way valve is irremovably connected to the second water chamber.

6. The fish tank of claim 1, wherein the one-way valve comprises an opening for fluidly connecting to the orifice of the removable syringe, the opening of the one-way valve positioned outside of the first water chamber and the second water chamber.

7. The method of claim 3, further comprising disengaging the device from the one-way valve and depositing the water drawn from the second chamber to a position away from the fish tank.

8. The method of claim 3, further comprising removing the device from the fish tank without contacting the water in the first water chamber with the device.

* * * * *